July 3, 1956   J. W. GRAY   2,753,498
CYCLIC FUNCTION MODIFYING CIRCUIT
Filed Dec. 31, 1952
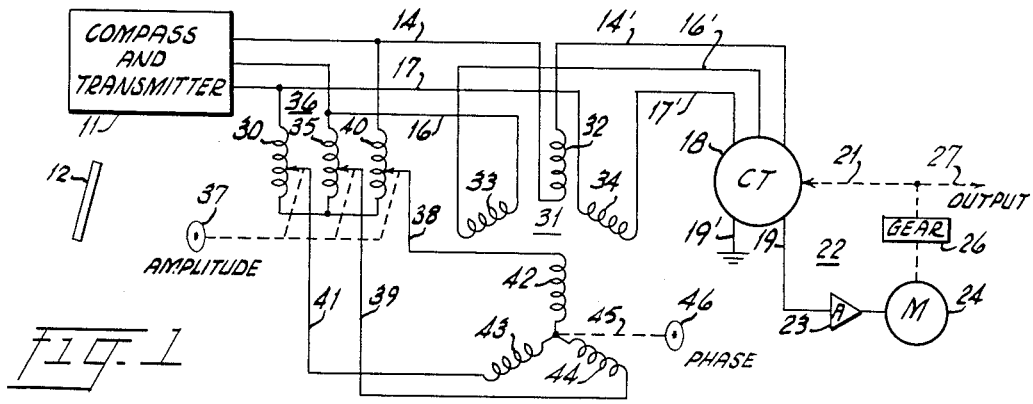
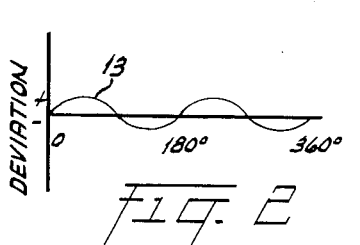
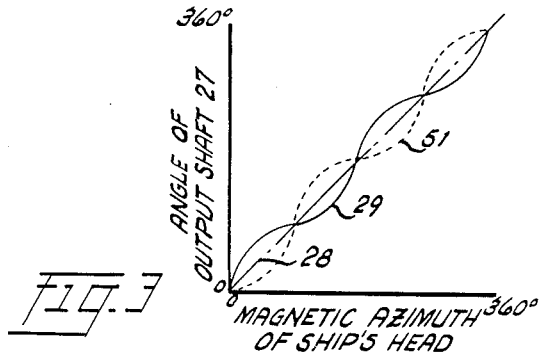
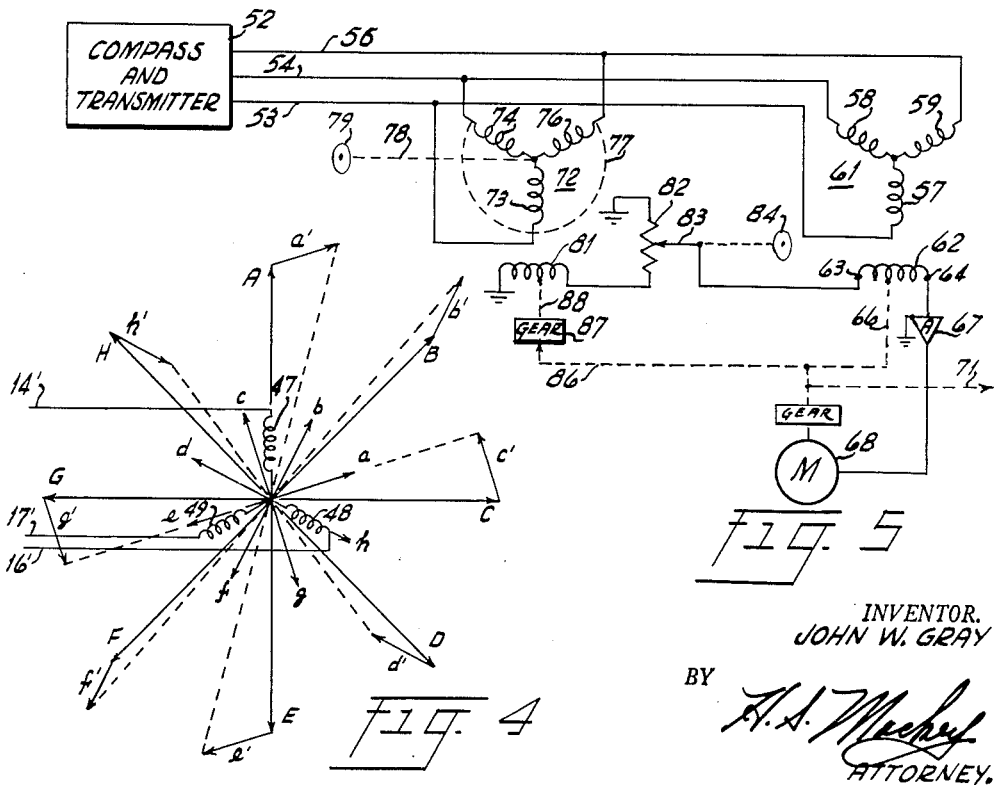
INVENTOR.
JOHN W. GRAY
BY
*H. A. Mickey*
ATTORNEY.

United States Patent Office 2,753,498
Patented July 3, 1956

2,753,498

CYCLIC FUNCTION MODIFYING CIRCUIT

John W. Gray, Chappaqua, N. Y., assignor to General Precision Laboratory Incorporated, a corporation of New York Application December 31, 1952, Serial No. 329,044

4 Claims. (Cl. 318—24)

This invention relates to an arrangement for correcting for magnetic compass deviation error and more specifically for correcting for the double frequency portion of such deviation error.

In the use of a magnetic compass on a vehicle, vessel or craft of any kind, deviation is defined as the departure of the compass indication from the magnetic meridian due to the presence of magnetic material on the vehicle. If the magnetic material has low retentivity its magnetism is only that induced by the earth's field and its polarity is dependent upon the heading or attitude of the vehicle. The presence of such a mass in the vicinity of the compass produces an error in the compass data which varies through two complete and nearly similar cycles as the vehicle's heading is swung through 360° of azimuth angle. In this sense the soft iron or other low retentivity magnetic mass produces a double frequency compass error. It is this double frequency error which is neutralized by the means of the apparatus of this invention, by introducing data of equal intensity and opposite phase to the electrical compass data transmission system.

Broadly considered, this invention is not only useful as a means of correcting such compass deviation error, but provides means for inserting a multiple frequency component in any cyclic function.

In general the instant invention incorporates a synchro data transmission system, consisting of a synchro transmitter, synchro repeater and differential or control synchro, or equivalent, in association with a variable transformer arrangement which introduces into the data transmission system a signal whose frequency is a multiple of the fundamental frequency of the cyclic input applied to the synchro transmitter. Provisions are made for adjustment of both the magnitude and phase of the multiple frequency component relative to the primary frequency component.

In applying this invention to the neutralization of the double frequency portion of the deviation error of a magnetic compass, the angular displacement input data are taken from the compass by means of any conventional type of take-off which provides data output of the rotating phase or synchro type, and after inserting the correction the output data are converted to mechanical shaft displacement by the use of a control synchro and with the aid of a position servomechanism.

It is possible by means of this invention to introduce to an electrical data transmission system for transmitting angular displacement or angular velocity at a fundamental frequency, not only a second harmonic component, but also a component whose frequency is any desired multiple of the fundamental frequency. This introduced frequency component is not restricted to harmonic or integral multiples of the fundamental frequency, but can have any positive value whatever whether higher or lower than the fundmental frequency.

The general purpose of this invention, therefore, is to generate and introduce a multiple frequency component into an electrical data transmission system carrying fundamental frequency data so that the system output delivers data consisting of the amplitude sum of the fundamental and multiple frequency components.

One particular purpose of this invention is, in an electrical data transmission system carrying magnetic compass data having a fundamental frequency component and a component having double the fundamental frequency, to generate and introduce a double frequency component having the same magnitude but of opposite phase to that of the data double frequency component, thus neutralizing the double frequency component and leaving only the fundamental frequency component in the output.

A further understanding of this invention may be secured from the detailed description and drawings, in which:

Figures 1 and 5 illustrate the circuits of two embodiments of the invention.

Figures 2 and 3 are graphs of voltage output.

Figure 4 is a vector diagram illustrating the operation of the invention.

Referring now to Fig. 1, a magnetic compass of any type combined with a suitable take-off device and synchro data transmitter is indicated at 11. The compass is assumed to be mounted in a vehicle such as, for example, a marine vessel or an aircraft, and the bar 12 positioned near the compass 11 represents diagrammatically the proximity of any magnetic mass, such as, for example, the steel hull of the marine vessel in which the compass is installed. The compass error or deviation caused by such a magnetic mass is depicted in Fig. 2, in which the abscissae represent the magnetic azimuth angle through which the ship's head moves as the ship is swung from north clockwise through a full circle of 360° and back to north. The ordinates indicate the deviation of the compass azimuth indication from the true azimuth. The deviation thus caused by a soft iron mass is ideally represented by the sine curve 13 which executes two full cycles in the abscissa distance of 360°, and ordinarily does not exceed a maximum deviation of 3°. This deviation may be loosely termed a "double frequency" deviation, in the sense that it executes two cycles during a single cycle of azimuth movement of the ship's head. However, in terms of the time rate of change of azimuth of the ship's head the deviation is truly a double frequency.

The compass output is applied through the synchro transmitter, which is of the three phase type, and the conductors 14, 16 and 17, Fig. 1, to a control transformer or control synchro 18. This device has the characteristic that in the absence of any correcting signal such as is later described, the output at conductors 19 and 19' is at zero potential when the shaft 21 is at the same angle relative to its stator as the transmitter shaft is relative to its stator. When, however, the two rotors differ in angular position, the alternating voltage output between conductors 19 and 19' represents that angular difference by its magnitude and the sense by its phase. A conventional position servomechanism 22 comprising amplifier 23, motor 24, gear 26 and output shaft 27 is connected to the control transformer electrical output 19 and to its shaft 21, whereby the shaft is kept at all times at the same angle as that of the transmitter. The output shaft 27 therefore has the same angular displacement at any instant as that of the transmitter and of the compass needle.

This output shaft angle is plotted in Figure 3 against magnetic azimuth angle of the ship's head as it is swung, in order to show the effect of the double frequency error. The straight line 28 represents output shaft angle variation as it would be in the absence of deviation error, and 29 represents the shaft angle variation when the compass is affected by the presence of a magnetic mass producing the double frequency deviation error. This error is of course the vertical distance between the two lines at any azimuth angle as explicitly plotted in Fig. 2.

As thus far described the presence of the differential synchro 31, constituting a portion of the arrangement for correcting for the double frequency deviation error has been ignored. As indicated in Fig. 1 the differential synchro 31 comprises a three phase stator consisting of windings 32, 33 and 34 spaced 120 electrical degrees as respects each other and a three phase rotor consisting of windings 42, 43 and 44 likewise disposed 120 electrical degrees as respects each other and angularly positioned by the knob 46 and shaft 45. Each of the stator windings 32, 33 and 34 is connected in series in a respective conductor 14, 16 and 17. An auto transformer 36 having windings 30, 35 and 40 is connected across the conductors 14, 16 and 17 and has a high impedance so as not to overload the compass synchro transmitter 11. Each of the windings 30, 35 and 40 is provided with a variable tap connected for conjoint adjustment by the knob 37 and electrically connected to the rotor windings 42, 43 and 44 by means of conductors 38, 39 and 41.

In the absence of any appreciable magnetic field in synchro 31 the stator windings 32, 33 and 34 have no effect upon the angular output of the control transformer 18, and merely add a negligible impedance in series with the conductors 14, 16 and 17. However, when a magnetic field is produced in synchro 31 by current flowing in the rotor windings 42, 43 and 44, and the stator circuits are closed, current is induced in these windings as follows. Let it be supposed, as the ship's head is swung, causing the compass card to rotate 360° relative to its lubber line, that the progression of the phases of the voltages in the lines 14, 17 and 16 applied to the windings 32, 34 and 33 rotates clockwise as viewed in Fig. 1. At the same time, because of the reversal of rotor conductors 39 and 41, the direction of rotation of the rotor field of differential synchro 31 is counterclockwise and induces a counterclockwise component in the stator, causing corresponding currents to be induced in the coils 32, 33 and 34, progressing counterclockwise from coil to coil. This produces corresponding voltages between the conductors 14', 16' and 17' and in the input coils of the control transformer 18, resulting in two cycles of potential variation in the output thereof during one cycle of swing of the ship's head, in addition to the normal output heretofore described. By appropriate adjustment of the phase of this potential variation by knob 46 and of its magnitude by knob 37, this double frequency potential variation may be made to be exactly equal and opposite to the double frequency error deviation, thus neutralizing it and producing an output at the shaft 27 which is represented by the straight line 28, Fig. 3.

The manner in which this action is accomplished is perhaps more clearly seen in terms of the addition of oppositely rotating vectors. In Fig. 4 the input coils of the control transformer 18 are indicated at 47, 48 and 49, fed by conductors 14', 16' and 17'. The coils are spatially separated by 120° electrical intervals, so that as they receive varying excitation, with the maximum passing from one to the other in turn, the composite field of the three coils has an average direction that varies from instant to instant in step with the change in input data received through the conductors 14', 16' and 17'. Thus at one time the maximum field direction is in the direction of the large arrow A, later it is in the direction of arrow B, then arrow C, and so on through the directions D, E, F, G and H until the field maximum has rotated a complete revolution clockwise around the circle and back to direction A. Let it be assumed that the input data causing this progression are received from the compass 11, Fig. 1, and that for the purpose of this explanation these input data contain no deviation error.

At the same time additional input data are received from the differential synchro 31. These data consist of voltages superimposed upon the voltages already imposed on the conductors 14', 16' and 17' and applied to the coils 47, 48 and 49 in addition to the other voltages applied thereto. These new voltages also produce at any instant a composite maximum field in a single direction. Let it be supposed, at the instant when the compass field maximum is in the direction A, that the differential synchro field maximum is in the direction a, and furthermore that the latter field maximum value is much smaller than that of the former field. This fact is indicated by the shorter length of the arrow a as compared to the arrow A. Thus these arrows have both magnitude and direction, representing the magnitudes and directions of the fields at a selected instant and therefore the fields are described as vector quantities and the arrows constitute vector representations of the fields. In the next instance, when the compass-generated field is at B, the differential synchro generated field is at b, displaced in a counterclockwise direction from a. This direction of rotation follows from the reversal of the conductors 39 and 41 feeding the differential synchro rotor. Thus while the compass-generated field rotates clockwise from A through one revolution, the differential synchro generated field rotates counterclockwise from a through one revolution, and the rotation of either field relative to the other field is not one but two revolutions.

This is easily demonstrated by adding vectors a and A, b and B, etc., and plotting the angular differences between the sums and the ship's heading angles. This is done graphically by replotting vector a as parallel vector a' from the tip of vector A, and drawing a dashed line from the tip of a' to the center, and similarly with the other vectors. The vector sums represented by the dashed lines represent, by their angular divergences from the compass vectors A, B, etc., the corrections introduced by the differential synchro. These corrections change signs several times around the circumference so that, when these corrections are plotted against the angles of A, B, etc., a curve similar to that of Fig. 2 results. If the angles of the dashed lines be plotted against the angles of the vectors A, B, etc., a wavy curve similar to that of 29, Fig. 3 is the result.

If now the compass-generated input to the control transformer 18, Fig. 1, has the wavy characteristic represented by 29, Fig. 3, and by means of the differential synchro 31, Fig. 1 and the method described a similar wavy line correction is introduced having the same amplitude as the compass-generated second-harmonic error but with exactly the opposite phase, as represented by the dashed line 51, Fig. 3, then obviously the correction neutralizes the error, leaving the straight line characteristic curve 28. In other words, the double frequency compass deviation has been corrected by simple electrical means including the differential synchro 31 and the transformer 36.

A modified electrical circuit for accomplishing the same purpose is illustrated in Fig. 5. This circuit has the advantage that it can be employed to generate not only the second harmonic, but can be employed to generate a frequency that is any multiple or submultiple of the fundamental frequency. In order to accomplish this result the modified arrangement of Fig. 5 introduces the correction in the secondary circuit of the control synchro rather than in its primary circuits, and a corollary the position servomechanism shown in Fig. 1 as an auxiliary part of that circuit is an essential part of the circuit of Fig. 5.

In Fig. 5 the compass and transmitter 52, of the three-phase type, generates position data signals in the form of alternating voltages between the conductors 53, 54 and 56. These voltages are applied to the primary coils 57, 58 and 59 respectively of a control synchro 61 having a single secondary winding 62. The three primary windings 57, 58 and 59 are arranged with their magnetic axes at 120° intervals and the synchro is arranged for rotation of these primary windings relative to the secondary winding 62. Either the primary windings or the secondary windings may be positioned on the rotor, with the other on the stator. In this example the secondary winding 62 is carried by the rotor, with the windings 57, 58 and 59 fixed relative to the frame except for a limited manual rotational adjustment that is customarily provided in synchro instruments. Unlimited rotor rotation is permitted, the rotor terminals being connected through brushes and rings with the external circuit at terminals 63 and 64, this unlimited rotation being schematically indicated by the dashed line 66 representing the rotor shaft.

The control synchro 61 is similar to synchro 18 of Fig. 1, and like it generates a potential in its secondary winding 62 that represents by its magnitude and sign or phase the divergence of the position of the rotor and its shaft relative to the stator from a position representing the shaft position of the compass transmitter 52 relative to its stator.

A position servo comprising amplifier 67, motor 68 and gears 69 causes the shaft 66 to position the coil 62 so that the magnitude of the voltage applied from secondary winding terminal 64 to amplifier 67 is kept at zero or null.

The circuit as so far described is conventional, and if the terminal 63 is grounded the output of the servomechanism shaft 71 is a faithful reproduction of the compass input at 52. In the absence of deviation and other errors the relation of output to the azimuth of the ship's head as it is swung is represented by the straight line 28, Fig. 3, and in the presence of deviation of the second harmonic type the output is represented by the curved line 29.

A second synchro 72 identical in form to synchro 61 is energized from the conductors 53, 54 and 56, the primary coils 73, 74 and 76 of the control synchro 72 being connected across the line in parallel with the primary coils 57, 58 and 59 of synchro 61. The similarity of connection is intended to imply that, as the ship's head is swung, the field rotations are in the same direction in the two synchros.

The stator of the synchro 72 is indicated by the dashed circle 77, and the fact that it is capable of manual adjustment relative to the frame is indicated by a shaft 78 and a manual knob 79. The secondary coil 81 of synchro 72 is shunted by a voltage dividing resistor 82, and a connection is made from the slider 83 thereof to the terminal 63 of synchro 61. This places the potential generated in secondary winding 62 in series with a selected fraction of the potential generated in secondary winding 81, the fraction being selected by the manually operated knob 84, connected to slider 83. The secondary winding 81 on the rotor of synchro 72 is rotated by the servomechanism output shaft through shaft 86, gear 87 and shaft 88. However, the direction of rotation of the rotor 81 is opposite to that of rotor 62. As a result, while the rotor 62 is kept relatively close to its zero output position by the servomechanism, if gear 87 has a 1:1 ratio, the rotor 81 rotates through two full electrical cycles during one revolution of the ship's head, because the rotor 81 rotates one revolution in one direction while its stator field rotates one revolution in the opposite direction.

The error signal impressed on the amplifier 67 which acts to operate the motor 68, output shaft 71 and rotor positioning shafts 66 and 86, therefore consists of the null potential of the rotor 62 determined by the energization of the stator 57, 58 and 59 which is in turn proportional to the compass data including a two cycle deviation error and also of a potential whose magnitude depends on the setting of the slider 83 and which varies as the second harmonic of the potential applied to the conductors 53, 54 and 56, that is, as the compass data. Thus, while the output of rotor 62 is ascendant in controlling the servomechanism and the position of its output shaft 71 in accordance with the compass data input, the synchro 81 adds a second harmonic function to the shaft 71 output which is controllable in both magnitude and phase by the knobs 84 and 79. Therefore, if the compass data input contains a second harmonic component it can be completely neutralized by the output of synchro 72, as indicated in Figure 3, by the appropriate adjustments of controls 79 and 84.

Exactly the same result can be secured by rotating the rotor 81 in the same direction as the rotor 62, but with a three-to-one speed increase secured in gear box 87. The second harmonic frequency of the fundamental is again secured from the rotor 81 and the composite output is again that indicated by Figure 3. In this case the second harmonic is likewise generated by the synchro 72 because the difference in angular displacement of the rotor and the field is two revolutions while the field makes one revolution.

The circuit of Fig. 5 can be made to generate any multiple of a fundamental frequency. If the pure fundamental frequency be generated at 52, it is obvious that by appropriate choice of the ratio of gear 87 and of the direction of rotation, any integral or non-integral multiple, or integral or non-integral submultiple of the fundamental frequency can be secured and delivered at shaft 71 in any desired strength relative to the fundamental. For example, a rotation of the rotor 81 of two revolutions during one field revolution in the opposite direction results in three relative revolutions and the introduction of a third harmonic frequency. In general, a multiple frequency equal to the algebraic difference of the two rotations is introduced. For example, if the rotor is rotated in the same direction as the field but at a speed of either 0.9 or 1.1 of the field speed, a frequency of one-tenth of the fundamental frequency will be added to the fundamental frequency at the output shaft 71.

What is claimed is:

1. A cyclic function modifying circuit comprising, a synchro transmitter generating a cyclically varying signal representative of a cylically varying mechanical displacement applied to the input thereof, a first synchro having its stator energized by said cylically varying signal, a servo loop including the rotor of said first synchro for positioning a mechanical output member, a second synchro having its stator energized solely by said cyclically varying signal, means for displacing the rotor of said second synchro as a function of the positioning of said mechanical output member, and means for applying a portion of the energy induced in the rotor of said second synchro to the rotor of said first synchro.

2. A cyclic function modifying circuit comprising, a synchro transmitter generating a cyclically varying signal representative of a cyclically varying mechanical displacement applied to the input thereof, a first synchro having its stator energized by said cyclically varying signal, a servo loop including the rotor of said first synchro for angularly positioning an output shaft, a second synchro having its stator energized solely by said cyclically varying signal, means for displacing the rotor of said second synchro as a function of the angular position of said output shaft, a potential divider connected in shunt to the rotor of said second synchro, and means for impressing a selected portion of the potential produced across said potential divider on the rotor of said divider on the rotor of said first synchro.

3. A cyclic function modifying circuit comprising, a synchro transmitter generating a cyclically varying signal representative of a cyclically varying mechanical displacement applied to the input thereof, a first synchro having its stator energized by said cyclically varying signal, a servo loop including the rotor of said first synchro for angularly positioning an output shaft, a second synchro having its stator energized solely by said cyclically varying signal, means for displacing the rotor of said second synchro at a rate equal to but in the opposite direction as respects the angular displacement of said output shaft, and means for applying a selected portion of the energy induced in the rotor of said second synchro to the rotor of said first synchro.

4. A cyclic function modifying circuit comprising, a synchro transmitter generating a cyclically varying signal representative of a cyclically varying mechanical displacement applied to the input thereof, a first synchro having its stator energized by said cyclically varying signal, a servo loop including the rotor of said first synchro for angularly positioning an output shaft, a second synchro having its stator energized solely by said cyclically varying signal, means for displacing the rotor of said second synchro at a rate which is a multiple of the rate of rotation of said output shaft, and means for applying a selected portion of the energy induced in the rotor of said second synchro to the rotor of said first synchro.

References Cited in the file of this patent
UNITED STATES PATENTS

| | | |
|---|---|---|
| 2,460,798 | McCarthy | Feb. 8, 1949 |
| 2,519,058 | Lundberg et al. | Aug. 15, 1950 |
| 2,572,044 | McCarthy | Oct. 23, 1951 |
| 2,581,436 | McCarthy | Jan. 8, 1952 |
| 2,651,010 | Wendt | Sept. 1, 1953 |